(12) United States Patent
Mulligan et al.

(10) Patent No.: US 9,939,222 B1
(45) Date of Patent: Apr. 10, 2018

(54) MULTI-LAYERED MORTAR TUBE

(71) Applicant: The United States of America as Represented by the Secretary of the Army, Washington, DC (US)

(72) Inventors: Christopher P. Mulligan, Mechanicville, NY (US); Andrew Littlefield, Watervliet, NY (US); Joshua Root, Albany, NY (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/275,886

(22) Filed: Sep. 26, 2016

Related U.S. Application Data

(60) Provisional application No. 62/245,357, filed on Oct. 23, 2015.

(51) Int. Cl.

| *F41A 21/00* | (2006.01) |
| *F41A 21/02* | (2006.01) |
| *B32B 9/00* | (2006.01) |
| *B32B 15/04* | (2006.01) |
| *B32B 9/04* | (2006.01) |
| *F41F 1/06* | (2006.01) |
| *B29C 70/32* | (2006.01) |
| *B29L 31/00* | (2006.01) |
| *C23C 4/11* | (2016.01) |
| *C23C 4/02* | (2006.01) |

(52) U.S. Cl.
CPC ............ *F41A 21/02* (2013.01); *B32B 9/005* (2013.01); *B32B 9/041* (2013.01); *B32B 9/045* (2013.01); *B32B 15/04* (2013.01); *F41F 1/06* (2013.01); *B29C 70/32* (2013.01); *B29L 2031/777* (2013.01); *B32B 2597/00* (2013.01); *C23C 4/02* (2013.01); *C23C 4/11* (2016.01)

(58) Field of Classification Search
CPC ......... F41A 21/02; B32B 9/005; B32B 9/041; B32B 9/045; B32B 15/04; F41F 1/06
USPC ................................. 89/1.35, 14.05
See application file for complete search history.

(56) References Cited

U.S. PATENT DOCUMENTS

| 3,517,585 | A | * | 6/1970 | Slade | F41A 21/02 42/76.01 |
| 4,892,764 | A | * | 1/1990 | Drain | B29C 35/02 156/161 |
| 5,531,150 | A | * | 7/1996 | Gegaregian | F41A 25/20 89/15 |
| 6,889,464 | B2 | * | 5/2005 | Degerness | F41A 21/02 42/76.01 |

(Continued)

*Primary Examiner* — Samir Abdosh
(74) *Attorney, Agent, or Firm* — Lisa H. Wang

(57) ABSTRACT

A lightweight mortar tube is presented herein having at least three layers: (1) a first inner bore facing layer comprised of a metal having a melting point greater than 800° C.; (2) a second thermal barrier layer comprised of a ceramic material attached to the first layer, and (3) a third outer shell layer attached to the second layer comprising of fiber reinforced composite material where the composite material is either a polymer, metal or ceramic. All of the layers are cohesively integrated with each other into a seamless wall. The improved multi-layered mortar tube described herein is lighter, yet maintains the same performance standards as comparable steel-based mortar tubes.

12 Claims, 1 Drawing Sheet

(56) References Cited

U.S. PATENT DOCUMENTS

| | | | | |
|---|---|---|---|---|
| 7,650,710 B1* | 1/2010 | Conroy | ............ | F41A 21/22 |
| | | | | 148/207 |
| 7,963,202 B1 | 6/2011 | Becker | | |
| 2004/0244257 A1* | 12/2004 | Degerness | ............ | F41A 21/02 |
| | | | | 42/76.02 |
| 2006/0243124 A1* | 11/2006 | Jackson | ............ | F41B 6/006 |
| | | | | 89/1.8 |
| 2011/0011253 A1* | 1/2011 | Fonte | ............ | B21J 5/00 |
| | | | | 89/14.05 |
| 2016/0265863 A1* | 9/2016 | Lincoln | ............ | F41A 21/02 |

* cited by examiner

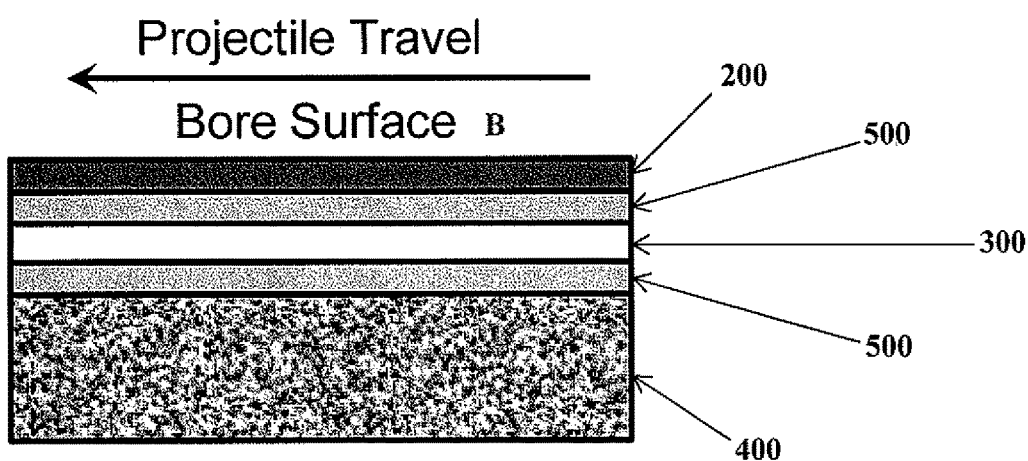

MULTI-LAYERED MORTAR TUBE

RELATED APPLICATIONS

This application claims the benefit of U.S. provisional application No. 62/245,357 filed Oct. 23, 2015, the contents of which are incorporated herein in its entirety.

RIGHTS OF THE GOVERNMENT

The inventions described herein may be manufactured and used by or for the United States Government for government purposes without payment of any royalties.

FIELD OF INVENTION

The invention relates to mortar tubes generally and specifically to multi-layered mortar tubes that are lightweight, erosion resistant, and thermal shock tolerant.

BACKGROUND OF THE INVENTION

Mortars are widely used for indirect fire during combat operations. For instance, the 60 mm and 81 mm mortars are crew carried weapons that offer immense firepower but add a significant weight burden on the soldier. Efforts to reduce the weight of these mortars have been met with a corresponding decrease in the range, effectiveness or lethality of the weapon. Attempts to reduce the weight with composite materials such as fiberglass have failed to meet the rigorous requirements for the strength to fire higher zone charges or the necessary thermal resistance to sustain a high number of rounds or rounds at a high enough firing rate. Mortars fabricated with superalloys as described in U.S. Pat. No. 7,963,202 issued to Becker et al offer only modest weight savings, typically about 11%, over legacy steel counterparts. Thus, a need exists for significantly reducing the weight of mortars for better soldier maneuverability without sacrificing the weapon's durability and effectiveness under combat situations.

SUMMARY OF THE INVENTION

It is an object of the invention to provide a multi-layered mortar tube that weighs significantly less than comparable monolithic steel or superalloy mortar tubes without any sacrifice in durability, thermal stability, or erosion resistance.

In one aspect of the invention, the layered mortar tubes comprise a plurality of layers: a first inner bore facing layer comprised of a metal material wherein the metal material has a melting point above 800° C., and preferably above 1200° C., a second intermediate thermal barrier layer wherein the thermal barrier layer is comprised of a ceramic material, and a third outer shell layer comprising a fiber reinforced composite material. The metal material in the inner bore facing layer may be any moderate to high melting point (minimum 800° C. melting temperature) pure metal or metal alloy including but not limited to the common metallic elements used in engineering materials, Fe, Co, Ni, Cu, Al, Ti, Cr, V, Mo, Ta, W, Nb, etc. as well as alloys of each such as steel, stainless steel, nickel or cobalt alloys/superalloys, titanium alloys, refractory alloys, etc. The ceramic material in the intermediate thermal barrier layer may be comprised of any high temperature thermally insulating material, including but not limited to yttria-stabilized zirconia, ceria-stabilized zirconia, alumina, mullite, zirconates, silica, etc. The fiber reinforced composite material may be polymer, metal or ceramic matrix based composite material with continuous fiber as the reinforcement. Fibers that could be used as reinforcement include but are not limited to carbon fiber (T700, IM7, IM9, T300, T1000, etc), Nextel ($Al_2O_3$), SiC, boron, and fiberglass.

In another aspect of the invention, the second intermediate layer is attached to the inner and outer layers by a bonding layer, such bonding layer is typically comprised of MCr, MAl, or MCrAlY, where M is a metal selected from the group consisting of nickel or cobalt and Cr is chromium, Al is aluminum and Y is yttrium.

BRIEF DESCRIPTION OF THE DRAWINGS

Further objects and advantages of the present invention will become apparent from the following detailed description of the invention when taken in conjunction with the accompanying drawing. The layers in FIG. 1 are shown for schematic purposes and are not to scale.

FIG. 1 is a sectional view of an exemplary multi-layered mortar tube.

DETAILED DESCRIPTION

Disclosed herein is a mortar tube defined by a muzzle end, a breech end and a seamless rigid wall along the longitudinal axis encasing a hollow bore. The rigid wall is comprised of multiple heterogeneous layers having the main elements of 1) an inner bore facing layer, 2) an intermediate ceramic based thermal barrier layer and 3) an outer shell layer. The plurality of layers are cohesively integrated with each other in a seamless manner to yield a rigid and immobile mortar tube wall.

The improved mortar tube meets the same performance specifications of standard steel or superalloy mortar tubes. The multi-layered mortar tube allows for firing of the same ammunition, at the same firing rate and the same wear life but without the added weight of comparable steel mortar tubes. Such improved mortar tube weigh at least 30-70% less compared to legacy steel tubes. This permits the soldier to carry less weight thereby increasing maneuverability and freeing up the weight burden to carry other important equipment.

FIG. 1, illustrates a sectional view of an exemplary mortar tube wall of the present invention (not to scale) comprising a plurality of layers; with a first inner bore facing layer 200 closest to the inner bore B, a second thermal barrier layer 300 comprising a ceramic base material, and a third structural outer shell layer comprised of fiber reinforced composite material 400. Optional bonding layers 500 may be used to adhere the multiple layers together to form a cohesively integrated wall structure.

Inner Bore Facing Layer

The inner bore facing layer of the layered mortar tube is proximate to the hollow bore. It may be comprised essentially of a metal material having a melting point greater than 800° C., and preferably greater than 1200° C. Representative metals contemplated for use as the inner bore facing layer include Fe, Co, Ni, Cu, Al, Ti, Cr, V, Mo, Ta, W, Nb, etc. as well as alloys of each such as steel, stainless steel, nickel or cobalt alloys/superalloys, titanium alloys, refractory alloys, etc. Preferred metal materials include high strength gun steel, Ni or Co based superalloys, various types of stainless steel, refractory alloys, with Inconel 718® (nickel-based superalloy) or equivalent being more preferred. The thickness of the inner bore facing layer may be 0.003"-0.020" thick.

Thermal Barrier Layer

An intermediate thermal barrier layer comprising of ceramic material is placed between the inner bore facing layer and outer shell layer. The thermal barrier layer functions to prevent heat from transferring from the inner bore facing layer to the outer shell layer and to reduce the peak temperature that the composite material (outer shell layer) experiences. It is comprised of ceramic materials including but not limited to yttria-stabilized zirconia, ceria-stabilized zirconia, alumina, mullite, zirconates, silica, polymer-derived ceramics (e.g. polysiloxanes, polycarbosiloxanes) and combinations thereof. The thickness of the intermediate ceramic layer is about 0.003"-0.050".

Outer Shell Layer

The outer shell layer may be comprised of fiber reinforced composite material, which consists of a matrix reinforced with continuous fibers. This layer completely encloses the intermediate (thermal barrier) layer. The matrix material can be polymer, metallic or ceramic based. Fibers that could be used as reinforcement include but are not limited to carbon fiber (T700, IM7, IM9, T300, T1000, etc), Nextel ($Al_2O_3$), SiC, boron, and fiberglass. The wall thickness of the outer shell layer need not be a uniform thickness. The thickness of the outer shell layer is about 0.05"-0.3" and may be adjusted along its length based on the pressure travel curve. Thus, the outer shell layer may be thinner at the muzzle end than at the breach end to accommodate the varying pressure forces applied at each end when the mortar is fired. It is preferred that the outer shell layer has a greater thickness than the inner or intermediate layer.

Bonding Layers

Bonding layers may be optionally applied to adhere the thermal barrier layer to the bore facing layer and outer shell layer as well as reducing the expansion coefficient gradient between the ceramic layer and the inner and outer layers. The bonding layer may be composed of MCr, MAl, or MCrAlY, wherein M is a metal selected from the group consisting of nickel or cobalt, and Cr is chromium, Al is aluminum and Y is yttrium. A bonding layer comprised of MAl may preferably be used to bond the outer layer to the thermal barrier layer. The thickness of each bonding layer should be limited to 0.005" maximum (and more ideally 0.003") for optimal weight savings.

Exemplary Multi-Layered Wall Configuration

TABLE 1 sets forth the configuration and composition of a preferred mortar tube embodiment.

| | Layer | Dimensions | Composition |
|---|---|---|---|
| 1 | Inner (facing the bore) | ~0.003"-0.015" | Nickel-based superalloy (Inconel 718 ®) |
| 2 | Intermediate thermal barrier | ~0.002"-0.050" | Ceramic base material (e.g. yttria-stabilized zirconia, ceria-stabilized zirconia, alumina, silica) plus optional bond-coats |
| 3 | Outer shell layer | ~0.05"- 0.3" | High strength aluminum matrix composites or high temperature polymer matrix composites (e.g. MetPreg ® or PyroSic ®) |

Process

One approach for obtaining a multi-layered architecture is to begin with a seamless metal tube (preferably steel, nickel or cobalt and alloys of such) as the inner bore facing layer. The intermediate thermal barrier layer can be applied to the inner layer by conventional air plasma spray (APS) in the following sequence, (1) clean and abrasive grit blast the outer surface of the metal tube, (2) apply inner layer bond coat via APS to a thickness of 0.003-0.005", (3) apply yttria-stabilized zirconia thermal barrier layer via APS to a thickness of 0.005-0.008", (4) apply outer layer bond coat via APS to a thickness of 0.003-0.005".

The thermal barrier layer and its associated bonding layers can also be applied directly to the outer-surface of inner bore facing layer by common thermal/plasma spray, laser cladding, vapor deposition (e.g. electron beam physical vapor deposition), aqueous plating, shrink-fitting to a monolithic liner, high volume low pressure (HVLP) spray coating, or conventional spray painting techniques. Table 2 suggests several attachment methods with exemplary materials comprising the thermal barrier layer. Factors for selecting each of the attachment methods and materials may include maturity of the technology for such method, thermal shock requirements for the tube, environmental pollution, and costs.

TABLE 2

| METHOD FOR ATTACHMENT | THERMAL BARRIER LAYER MATERIAL |
|---|---|
| Plasma spray | Yttria stabilized zirconia (YSZ) based multilayers |
| Laser Cladding | Yttria stabilized zirconia (YSZ) |
| Conventional or High Volume Low Pressure (HVLP) Spray | Polymer-derived ceramic coatings (e.g. polysiloxanes, polycarbosiloxanes), Cerakote ™ (NIC) and Thermablock ™(MicroPhase) |
| Electron Beam Physical Vapor Deposition | Yttria Stabilized Zirconia (YSZ) based multilayers |

Following APS application of the thermal barrier layer, the outer surface of the bi-layer (inner and intermediate layer) can be encased by the composite outer shell layer. This layer may be formed by any of the traditional composite processing techniques. For purposes of fabricating the composite outer shell layer, the bi-layer (inner and intermediate) is treated as a traditional substrate/mandrel. Typical process that can be used include but are not limited to filament winding, fiber placement, tape placement, vacuum assisted resin transfer molding (VARTM), resin transfer molding (RTM) and casting. The exact techniques used will depend upon the specific fiber/matrix combination chosen. If an aluminum matrix and Nextel ($Al_2O_3$) fibers are picked then wet winding with molten aluminum or casting are possible choices. For polymer matrix composite, filament winding or tape placement followed by autoclave cure are more likely to be used. Depending on the initial thickness of the inner bore facing layer, the inner bore diameter may require honing to achieve a desired final thickness and surface finish.

The fabricated multi-layered mortar is seamless, finless, lightweight, and has the same or better performance and life characteristics as the legacy mortar tubes composed of steel.

The embodiments set forth above are for illustrative purposes only and it is recognized that numerous variations may be made with respect to the process and materials for preparing the thermal barrier layered composite mortar. Therefore, while the invention has been disclosed in various forms only, it will be obvious to those skilled in the art that additions, deletions and modifications can be made without departing from the spirit and scope of this invention, and no undue limits should be imposed, except as to those set forth in the following claims.

What is claimed is:

1. A mortar tube comprising:
   a muzzle end, a breach end, and a longitudinal axis defined by a rigid, circular wall encasing a hollow inner bore, said rigid wall comprising a plurality of heterogeneous layers, wherein the layers comprises;
   (a) a first inner bore facing layer proximate to the hollow bore, wherein said inner bore facing layer is comprised of a metal material wherein said metal has a melting point above 800° C.;
   (b) a second thermal barrier layer comprised of a ceramic material; and
   (c) a third outer shell layer comprised of a fiber reinforced composite material, wherein the plurality of heterogeneous layers are integrated as a seamless wall; and
   (d) wherein the first and second layers and second and third layers are bonded to each other by a bonding layer.

2. The mortar tube of claim 1, wherein said bonding layer is comprised of MCr, MAl, or MCrAlY, and wherein M is a metal selected from the group consisting of nickel or cobalt, and Cr is chromium, Al is aluminum and Y is yttrium.

3. The mortar tube of claim 1, wherein the metal material is selected from the group consisting of Fe, Co, Ni, Cu, Al, Ti, Cr, V, Mo, Ta, W, and Nb.

4. The mortar tube of claim 1, wherein the metal material is selected from the group consisting of alloys of steel, stainless steel, nickel or cobalt.

5. The mortar tube of claim 1, wherein the metal material is selected from the group of superalloys, titanium alloys, and refractory alloys.

6. The mortar tube of claim 1, wherein the metal material is a nickel-based superalloy.

7. The mortar tube of claim 1, wherein the ceramic material is selected from the group comprising of yttria-stabilized zirconia, ceria-stabilized zirconia, alumina, mullite, zirconates, silica, polymer-derived ceramics and combinations thereof.

8. The mortar tube of claim 1, wherein the fiber reinforced composite layer is comprised of continuous fibers set in a matrix comprised of a polymer base, metal or ceramic material.

9. The mortar tube of claim 8, wherein the continuous fibers are selected from the group consisting of carbon, $Al_2O_3$, SiC, boron, and fiberglass.

10. The mortar tube of claim 1, wherein the outer shell layer is thicker at the breach end relative to the muzzle end.

11. The mortar tube of claim 1, wherein the thickness of the outer shell layer is greater than the thickness of the first inner layer or the second thermal barrier layer.

12. A mortar tube comprising:
    a muzzle end, a breach end, and a longitudinal axis defined by a seamless, rigid, circular wall encasing a hollow inner bore, said rigid wall comprising a plurality of heterogeneous layers, wherein the layers comprises;
    (a) a first inner bore facing layer proximate to the hollow bore, wherein said inner bore facing layer is comprised of a metal material wherein said metal has a melting point above 1200° C.;
    (b) a second thermal barrier layer comprised of a ceramic material selected from the group comprising of yttria-stabilized zirconia, ceria-stabilized zirconia, alumina, mullite, zirconates, silica, polymer-derived ceramics and combinations thereof; and
    (c) a third outer shell layer comprising a fiber reinforced composite material comprised of fibers set in a polymer, metal or ceramic matrix;
    wherein the first and second and second and third layers are bonded to each other by a bonding layer, said bonding layer comprising MCrAlY, wherein M is a metal consisting of nickel or cobalt, and Cr is chromium, Al is aluminum and Y is yttrium.

* * * * *